(12) United States Patent
Ozawa et al.

(10) Patent No.: US 10,112,831 B2
(45) Date of Patent: Oct. 30, 2018

(54) CHLORINE DIOXIDE GENERATOR

(71) Applicant: TAIKO PHARMACEUTICAL CO., LTD., Suita-shi, Osaka (JP)

(72) Inventors: Fumihiro Ozawa, Suita (JP); Shigeo Asada, Suita (JP); Koichi Nakahara, Suita (JP); Kazuhiko Taguchi, Suita (JP)

(73) Assignee: TAIKO PHARMACEUTICAL CO., LTD., Suita-Shi, Osaka (JP)

( * ) Notice: Subject to any disclaimer, the term of this patent is extended or adjusted under 35 U.S.C. 154(b) by 9 days.

(21) Appl. No.: 15/377,642

(22) Filed: Dec. 13, 2016

(65) Prior Publication Data

US 2017/0088420 A1   Mar. 30, 2017

Related U.S. Application Data

(62) Division of application No. 14/006,919, filed as application No. PCT/JP2012/055614 on Mar. 6, 2012, now Pat. No. 9,533,272.

(30) Foreign Application Priority Data

Mar. 23, 2011   (JP) ................. 2011-064769

(51) Int. Cl.
*B01J 8/00* (2006.01)
*C01B 11/00* (2006.01)
*C01B 11/02* (2006.01)

(52) U.S. Cl.
CPC .......... *C01B 11/024* (2013.01); *B01J 8/0015* (2013.01); *B01J 2208/00752* (2013.01); *B01J 2208/00814* (2013.01)

(58) Field of Classification Search
CPC .. B01J 8/00; B01J 8/0015; B01J 2208/00743; B01J 2208/00752;

(Continued)

(56) References Cited

U.S. PATENT DOCUMENTS 4,330,531 A * 5/1982 Alliger ................. A61K 8/042
424/53
5,126,070 A 6/1992 Leifheit et al.
(Continued)

FOREIGN PATENT DOCUMENTS

CN    101925358 A    12/2010
EP    0423 817 A2    4/1991
(Continued)

OTHER PUBLICATIONS

International Search Report (PCT/ISA/210) dated Jun. 5, 2012, by the Japanese Patent Office as the International Searching Authority for International Application No. PCT/JP2012/055614.

(Continued)

*Primary Examiner* — Natasha E Young
(74) *Attorney, Agent, or Firm* — Buchanan Ingersoll & Rooney PC

(57) ABSTRACT

A method of producing chlorine dioxide involves generating chlorine dioxide gas by deforming a container body of a chlorine dioxide generator which is deformable in response to application of a force to the container body from outside of the container body. The deforming of the container body causes an enclosure contained in the cylinder body to be broken to bring an aqueous chlorite solution into contact with a solid acidic composition to generate chlorine dioxide gas that is discharged via a gas discharge port of the container body to outside of the container body. The method additionally involves submerging in water at least the gas discharge port of the container body during the generation of the chlorine dioxide gas to dissolve the chlorine dioxide gas discharged via the gas discharge port in the water.

18 Claims, 5 Drawing Sheets

(58) Field of Classification Search
CPC . B01J 2208/00796–2208/00814; C01B 11/00; C01B 11/02; C01B 11/022–11/024
See application file for complete search history.

(56) References Cited

U.S. PATENT DOCUMENTS

| | | |
|---|---|---|
| 6,238,643 B1 | 5/2001 | Thangaraj |
| 2001/0012504 A1 | 8/2001 | Thangaraj et al. |
| 2004/0062680 A1 | 4/2004 | Kampa et al. |
| 2004/0241065 A1 | 12/2004 | Kampa et al. |
| 2006/0127273 A1 | 6/2006 | Kampa |
| 2011/0020473 A1 | 1/2011 | Ogata et al. |

FOREIGN PATENT DOCUMENTS

| | | |
|---|---|---|
| JP | 02-164702 A | 6/1990 |
| JP | 03-164403 A | 7/1991 |
| JP | 3-126143 U | 12/1991 |
| JP | 1991-126143 U | 12/1991 |
| JP | 05-237365 A | 9/1993 |
| JP | 2001-522773 A | 11/2001 |
| JP | 2006-083056 A | 3/2006 |
| JP | 2007-145654 A | 6/2007 |
| WO | WO 2009/093540 A1 | 7/2009 |

OTHER PUBLICATIONS

Written Opinion (PCT/ISA/237) dated Jun. 5, 2012, by the Japanese Patent Office as the International Searching Authority for International Application No. PCT/JP2012/055614.

Office Action dated Jan. 7, 2015, by the Chinese Patent Office in corresponding Chinese Patent Application No. 201210071563.0. (8 pages).

Office Action (Patent Examination Report No. 1) dated Mar. 25, 2015, by the Australian Patent Office in corresponding Australian Patent Application No. 2012232473. (3 pages).

* cited by examiner

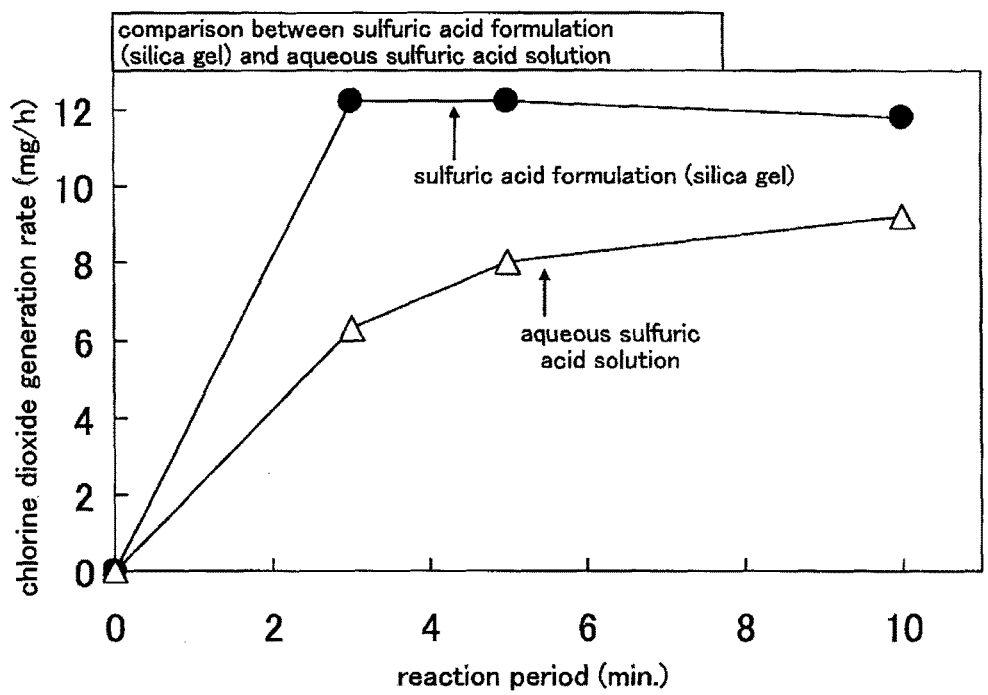
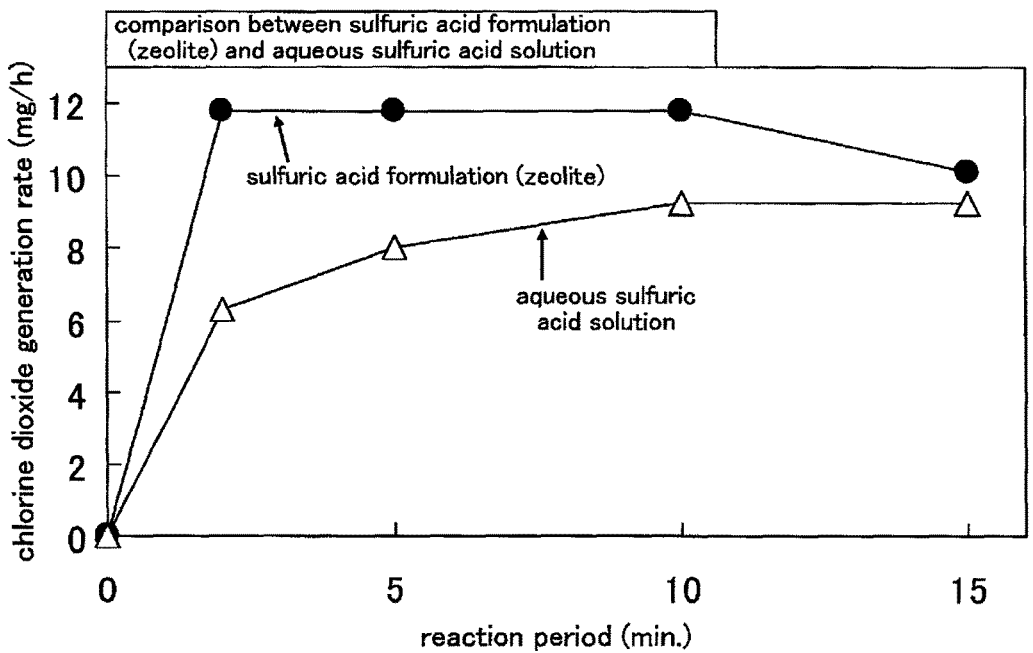

CHLORINE DIOXIDE GENERATOR

CROSS REFERENCE TO RELATED APPLICATION

This application is a divisional of U.S. application Ser. No. 14/006,919 filed on Dec. 4, 2013, now U.S. Pat. No. 9,533,272, which is a U.S. national stage application based on International Application No. PCT/JP2012/055614 filed on Mar. 6, 2012, and claims priority to Japanese Application No. 2011-064769 filed on Mar. 23, 2011, the entire content of each of which is incorporated here by reference.

TECHNICAL FIELD

The present invention relates to a chlorine dioxide generator (hereinafter, referred to simply as "generator") configured to generate chlorine dioxide gas through a reaction between a chlorite and an acidic substance.

BACKGROUND ART

Conventionally, there are known instruments or devices for generating chlorine dioxide gas through reaction between a solution of chlorite and an acidic substance (see Japanese Unexamined Patent Application Publication No. 2007-145654).

SUMMARY

However, the conventional chlorine dioxide generators were not designed for portability. Many of these are designed to be placed on a desk or a floor surface or they are large and complicated devices. Further, even when the device is formed compact for providing portability (mobility), the device would suffer such problem as possibility of liquid dripping or spill from inside the device. Although liquid dripping or spill can be prevented by ensuring sealing of the container, ensuring of sealing causes a new problem of increased resistance in discharging of chlorine dioxide gas.

Further, in case fumigation of a room, indoor space or other space with chlorine dioxide gas is desired, it is necessary to generate chlorine dioxide gas at a certain high concentration. Increase of the concentration of chlorine dioxide gas to be generated can be easily achieved via increase of the concentration of the acidic substance. However, such high concentration of acidic substance, e.g. high concentration of sulfuric acid, which is an extremely hazardous substance, requires caution in its handing. On the other hand, if the concentration of the acidic substance is lowered in order to avoid danger, this results in reduction in the generation efficiency of chlorine dioxide gas, thus causing a problem of making satisfactory fumigation treatment impossible.

The disclosed chlorine dioxide generator can be formed compact and allows safe carrying (transport) of a source of chlorine dioxide gas generation through effective prevention of liquid dripping or spill and that also allows one-setting transitory generation of a large amount of chlorine dioxide gas even with a low concentration of acidic substance and achieves reduction in the fumigation treatment period (waiting period for a human), thus allowing access by the human to the inside of the fumigated room immediately after air ventilation thereof.

The disclosed chlorine dioxide generator is configured to generate chlorine dioxide gas through a reaction between a chlorite and an acidic substance. The generator comprises:

a container body which is deformable in response to application of a force thereto from the outside;

wherein the container body includes a gas discharge port formed of a gas-permeable, water-impermeable or gas-permeable, water-permeation retardant member, the container body except for the gas discharge port being sealed, thus having a water-impermeable construction;

the container body contains therein a solid acidic composition and an aqueous chlorite solution under a non-contact condition from each other;

the solid acidic composition comprises a porous material containing an acidic substance that exhibits acidity when dissolved in water;

the aqueous chlorite solution is sealed within an easily breakable enclosure; and when the container body is deformed, the enclosure contained therein is broken to bring the aqueous chlorite solution into contact with the solid acidic composition, whereby chlorine dioxide gas is generated and this chlorine dioxide gas is discharged via the gas discharge port to the outside of the container body.

With the above-described arrangement, in the container body, its gas discharge port is formed of a gas-permeable, water-impermeable or gas-permeable, water-permeation retardant member, the container body except for the gas discharge port being sealed, thus having a water-impermeable construction. Therefore, this is hardly any concern about liquid dripping or spill.

Further, when an external force is applied to the container body containing therein a solid acidic composition and an aqueous chlorite solution under a non-contact condition from each other, the enclosure contained therein can be readily broken. With this, the aqueous chlorite solution flows out of the enclosure to the inside of the container body. As a porous material containing an acidic substance is stored inside the container body, the flown-out aqueous chlorite solution comes into contact with this porous material, thus contacting the acidic substance, whereby chlorine dioxide gas is generated. This chlorine dioxide gas generated inside the container body will then be discharged via the gas discharge port formed of a gas-permeable, water-impermeable or gas-permeable, water-permeation retardant member to the outside of the container body.

In association with this discharge of chlorine dioxide gas through the gas discharge port, there occurs increase in the concentration of chlorine dioxide gas inside the fumigation room, so that a chlorine dioxide treatment (sterilizing treatment of germs, fungi, virus inactivation treatment, extermination treatment of harmful insects, etc.) to an object to be treated can be carried out for a predetermined time period inside the fumigation room. As will be explained in an embodiment to be described later, the generation of chlorine dioxide gas in this takes place in a large amount and at one setting and in a transitory manner. That is, after a large amount of chlorine dioxide gas is generated in a short period and then the amount of chlorine dioxide gas generated becomes smaller after a while. Therefore, it is possible to reduce the fumigation treatment period (waiting period for a human) of the space inside the fumigation room, so that a human can enter the fumigation room immediately after its air ventilation.

The probable reason why a large amount of chlorine dioxide gas is generated at one setting and transitorily by the inventive chlorine dioxide generator is as follows. As the acidic substance is contained in the solid porous material, it is possible to reduce the amount of free water in the reaction system. Namely, it is possible to cause the acid substance to react at a higher concentration than the apparent concentration of this acidic substance in the solid acidic composition. Therefore, the contact area (reaction opportunity) between the chlorite and the acidic substance is increased so that the reaction rate becomes higher, whereby the reaction occurs at one short time altogether, whereby the chlorine dioxide gas is generated drastically in a short period of time altogether (at one setting and in a transitory manner).

According to a second aspect of the disclosure here, a chlorine dioxide generator is configured to generate chlorine dioxide gas through a reaction between a chlorite and an acidic substance, and the generator comprises:

a container body which is deformable in response to application of a force thereto from the outside;

wherein the container body includes a gas discharge port formed of a gas-permeable, water-impermeable or gas-permeable, water-permeation retardant member, the container body except for the gas discharge port being sealed, thus having a water-impermeable construction;

the container body contains therein a solid chlorite composition and an aqueous solution of an acidic substance under a non-contact condition from each other;

the solid chlorite composition comprises a porous material impregnated with an aqueous solution of chlorite;

the aqueous solution of acidic substance is sealed within an easily breakable enclosure; and when the container body is deformed, the enclosure contained therein is broken to bring the aqueous acidic substance solution into contact with the solid chlorite composition, whereby chlorine dioxide gas is generated and this chlorine dioxide gas is discharged via the gas discharge port to the outside of the container body.

With the above-described arrangement, in the container body, its gas discharge port is formed of a gas-permeable, water-impermeable or gas-permeable, water-permeation retardant member, the container body except for the gas discharge port being sealed, thus having a water-impermeable construction. Therefore, this is hardly any concern about liquid dripping or spill.

Further, when an external force is applied to the container body containing therein a solid chlorite composition and an aqueous acidic substance solution under a non-contact condition from each other, the enclosure contained therein can be readily broken. With this, the aqueous acidic substance solution flows out of the enclosure to the inside of the container body. As a porous material impregnated with an aqueous solution of chlorite is stored inside the container body, the flown-out aqueous acidic substance solution comes into contact with this porous material, thus contacting chlorite, whereby chlorine dioxide gas is generated. This chlorine dioxide gas generated inside the container body will then be discharged via the gas discharge port formed of a gas-permeable, water-impermeable or gas-permeable, water-permeation retardant member to the outside of the container body.

In association with this discharge of chlorine dioxide gas through the gas discharge port, there occurs increase in the concentration of chlorine dioxide gas inside the fumigation room, so that a chlorine dioxide treatment (sterilizing treatment of germs, fungi, virus inactivation treatment, extermination treatment of harmful insects, etc.) to an object to be treated can be carried out for a predetermined time period inside the fumigation room. As will be explained in an embodiment to be described later, the generation of chlorine dioxide gas in this takes place in a large amount and at one setting and in a transitory manner. That is, after a large amount of chlorine dioxide gas is generated in a short period and then the amount of chlorine dioxide gas generated becomes smaller after a while. Therefore, it is possible to reduce the fumigation treatment period (waiting period for a human) of the space inside the fumigation room, so that a human can enter the fumigation room immediately after its air ventilation.

The probable reason why a large amount of chlorine dioxide gas is generated at one setting and transitorily by the inventive chlorine dioxide generator is as follows. As chlorite is contained in the porous material, it is possible to reduce the amount of free water in the reaction system. Therefore, the contact area (reaction opportunity) between the chlorite and the acidic substance is increased so that the reaction rate becomes higher, whereby the reaction occurs at one short time altogether, whereby the chlorine dioxide gas is generated drastically in a short period of time altogether (at one setting and in a transitory manner).

According to another aspect of the disclosure here, the container body is provided in the form of a flexible tube that can be flexed into an arcuate shape in response to application of the external force.

With the above-described arrangement, the container body can be configured as a container body which is in the form of a tube (stick) having a bottomed (i.e. having a bottom) cylindrical shape having an open top. Hence, the chlorine dioxide generator can be formed compact, so that it becomes possible to carry (transport) a chlorine dioxide generation source.

Further, if the tubular container body storing therein e.g. a solid acidic composition and an aqueous chlorite solution under a non-contact condition from each other is broken with using a crimping tool or one applies an external force to this container body to bend it into an arcuate shape, with holding its right end with the right hand and the left end with the left hand, the easily breakable enclosure stored therein can be broken very easily.

According to another feature of the chlorine dioxide generator, the acidic substance comprises sulfuric acid and said chlorite comprises sodium chlorite or potassium chlorite.

With the above-described arrangement, sulfuric acid as an example of the acidic substance has good storage stability and will not generate corrosive gas and show no change in its concentration even after it is caused to be carried by the porous material. Hence, it had good handling readiness. Further, sodium chlorite or potassium chlorite as an example of the chlorite is easily available, so the present invention can be embodied easily.

Another feature of the chlorine dioxide generator is that the acidic substance has a concentration of 30 wt. % or less and said chlorite has a concentration from 0.1 to 30 wt. %.

With the above-described arrangement, if the concentration of the acidic substance exceeds 30 wt. %, this will result in increase in the viscosity of the solution, which results, in turn, in greater difficulty of dispersion. As a result, there will occur significant irregularity in the acidic substance prepared, disadvantageously. Further, if the concentration of chlorite falls below 0.1 wt. %, this may cause a problem that shortage of chlorite occurs in the generation of chlorine dioxide gas. On the other hand, if the concentration exceeds 30 wt. %, there may occur a problem of saturation and subsequent crystal deposition of chlorite. Therefore, in view of the safety and stability and efficiency of generation of chlorine dioxide gas, it is preferred that the concentration range from 0.1 to 30 wt. %.

According to a further feature, the porous material is disposed closer to the gas discharge port than to the enclosure.

If the porous material is disposed closer to the gas discharge port than to the enclosure as provided in the above arrangement, chlorine dioxide gas generated inside the container body can be discharged immediately via the gas discharge port to the outside of the container body. Hence, it becomes even easier to discharge a large amount of chlorine dioxide gas at one time (at one setting and in a transitory manner).

Another aspect of the disclosure here is that the generator further comprises an insulating member for insulating the porous material and the enclosure from each other, the insulating member having at least one hole portion and being disposed in such a manner as to be capable of preventing displacement of the porous material toward the enclosure.

With the above-described arrangement, since an insulating member is disposed between the porous material and the enclosure for preventing displacement of the porous material toward the enclosure, the porous material and the enclosure can be separated from each other in a reliable manner.

Further, since the insulating member is capable of preventing displacement of the porous material disposed closer to the gas discharge port than to the enclosure toward this enclosure, it becomes possible to allow the reaction for generating chlorine dioxide gas to take place on the side close to the gas discharge port in a reliable manner. With this, it becomes even easier to discharge a large amount of chlorine dioxide gas at one time (at one setting and in a transitory manner).

According to an additional aspect of the disclosure here, the container body includes a positioning means for setting movable range of the insulating member.

With the above-described arrangement, the range of movement of the insulating member inside the container body can be set in a reliable manner by the positioning means. With this, if e.g. the positioning means is used for setting the movable range of the insulating member in such a manner as to prevent movement of the porous material toward the enclosure inside the container body, it becomes possible to allow the chlorine dioxide generation reaction to take place on the side close to the gas discharge port. With this, it becomes even easier to discharge a large amount of chlorine dioxide gas at one time (at one setting and in a transitory manner).

Another aspect of the disclosure here involves a method of producing chlorine dioxide comprising:

generating chlorine dioxide gas by deforming the container body of the chlorine dioxide generator according to any one of the first through eighth characterizing features; and submerging in water at least the gas discharge port of the container body under the above condition of chlorine dioxide gas generation so as to dissolve the chlorine dioxide gas discharged via the gas discharge port in the water.

With the above, with utilizing the inventive chlorine dioxide gas generator capable of readily generating chlorine dioxide gas, simply by submerging at least the gas discharge port of the chlorine dioxide gas generator having generated chlorine dioxide gas in water stored in e.g. a water tank, an aqueous solution of chlorine dioxide can be produced easily.

In accordance with another aspect, a method of producing chlorine dioxide comprises: generating chlorine dioxide gas by deforming a container body of a chlorine dioxide generator which is deformable in response to application of a force to the container body from outside of the container body. The container body includes a gas discharge port formed of a gas-permeable, water-impermeable or gas-permeable, water-permeation retardant member. The container body, except for the gas discharge port, is sealed, thus having a water-impermeable construction. The container body contains a solid acidic composition and an aqueous chlorite solution under a non-contact condition from each other, the solid acidic composition comprises a porous material containing an acidic substance that exhibits acidity when dissolved in water, and the aqueous chlorite solution is sealed within a breakable enclosure. The deformation of the container body causes the enclosure contained in the cylinder body to be broken to bring the aqueous chlorite solution into contact with the solid acidic composition to generate chlorine dioxide gas that is discharged via the gas discharge port to outside of the container body. The method also includes submerging in water at least the gas discharge port of the container body during the generation of the chlorine dioxide gas to dissolve the chlorine dioxide gas discharged via the gas discharge port in the water.

According to another aspect, a method of producing chlorine dioxide comprises generating chlorine dioxide gas by deforming a container body of a chlorine dioxide generator which is deformable in response to application of a force to the container body from outside of the container body. The container body includes a gas discharge port formed of a gas-permeable, water-impermeable or gas-permeable, water-permeation retardant member, with the container body except for the gas discharge port being sealed to thus have a water-impermeable construction. The container body contains a solid chlorite composition and an aqueous solution of an acidic substance under a non-contact condition from each other, the solid chlorite composition comprises a porous material impregnated with an aqueous solution of chlorite, and the aqueous solution of acidic substance is sealed within an easily breakable enclosure. The deformation of the container body causes the enclosure contained in the container body to be broken to bring the aqueous acidic substance solution into contact with the solid chlorite composition to generate chlorine dioxide gas that is discharged via the gas discharge port to outside of the container body. The method also involves
submerging in water at least the gas discharge port of the container body during the generation of the chlorine dioxide gas to dissolve the chlorine dioxide gas discharged via the gas discharge port in the water.

BRIEF DESCRIPTION OF THE DRAWINGS

FIG. 2 is a graph showing results of chlorine dioxide gas generation test of inventive Example 2.

FIG. 3 is a graph showing results of chlorine dioxide gas generation test of inventive Example 3

DETAILED DESCRIPTION

Next, there will be explained an embodiment of the present invention with reference to the accompanying drawings.

Figure 1:
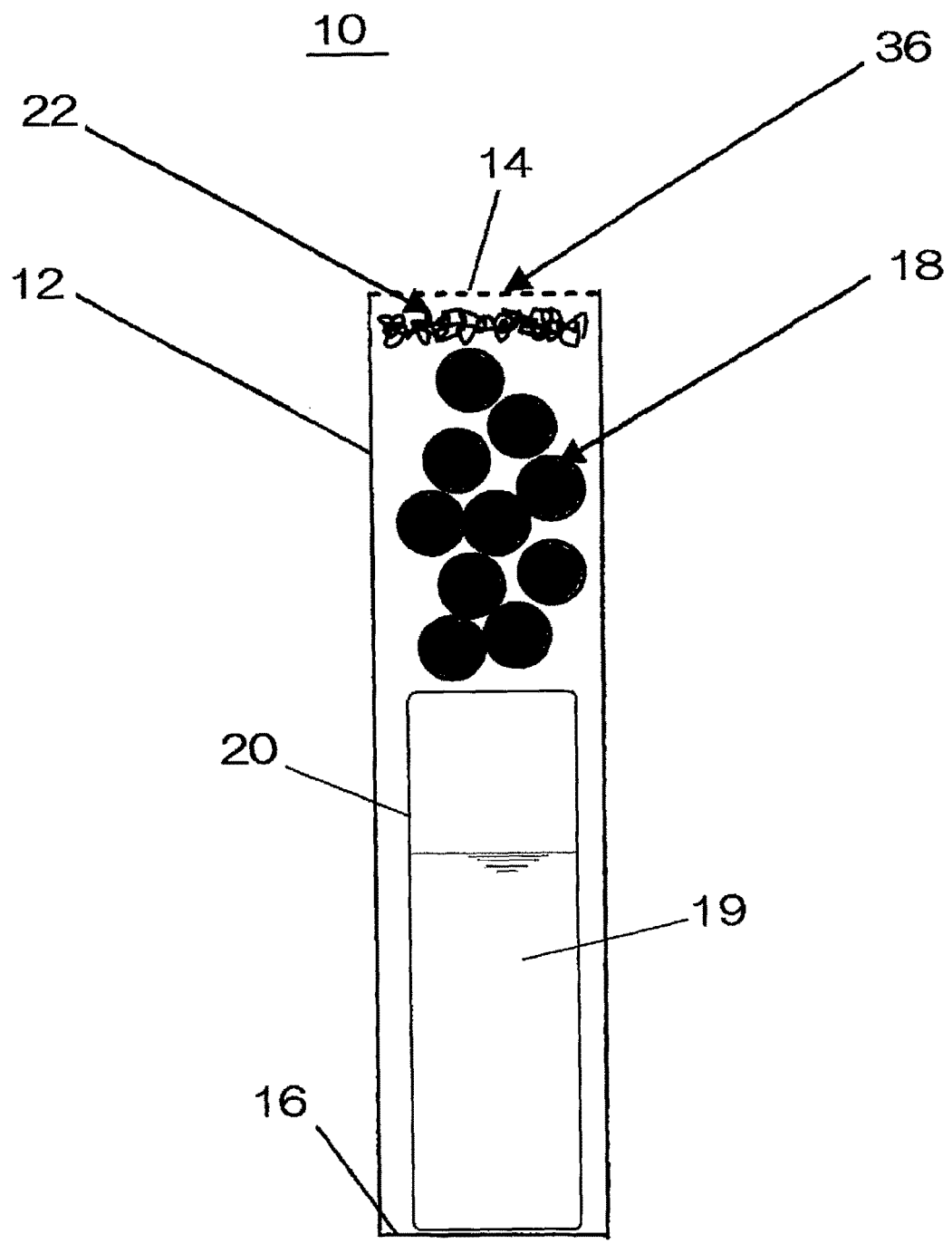
FIG. 1 is a section view of a generator illustrating one embodiment of the present invention.

A chlorine dioxide generator according to the present invention is configured to generate an amount of chlorine dioxide gas through a reaction occurring between a chlorite and an acidic substance. As shown in FIG. 1, this chlorine dioxide generator 10 includes a container body 12 which can be deformed in response to application of an external force thereto. This container body 12 includes a gas discharge port 14 formed of a gas-permeable, water-impermeable sheet and is configured as a water-impermeable construction sealed except for the portion of its gas discharge port 14.

In the instant embodiment, there will be explained a chlorine dioxide generator 10 configured such that the container body 12 stores therein a solid acidic composition 18 and an aqueous chlorite solution 19 under a non-contact condition from each other.

The solid acidic composition 18 comprises a porous material which contains an acidic substance that exhibits acidity when dissolved in water. Further, the aqueous chlorite solution 19 is sealed inside an easily breakable enclosure 20.

With the chlorine dioxide generator 10 configured as above in operation, when the container body 12 is deformed, the enclosure 20 stored therein is broken (or collapsed). With this break of the enclosure 20, the aqueous chlorite solution 19 comes into contact with the solid acidic composition 18, whereby an amount of chlorine dioxide gas is generated and this generated gas is discharged via the gas discharge port 14 to the outside of the container body 12.

(Container Body)

The container body 12 used in the inventive generator can be of any particular configuration as long as it is deformable in response to application of an external force thereto and has a space capable of storing the solid acidic composition 18 and a space for storing the enclosure 20. As an example of material for realizing such configuration, flexible materials can be cited. Here, the term "flexible" refers to the property of being readily deformed and bent into e.g. an arcuate form in response to application of an external force thereto and resuming its original shape upon release of the external force application. As some non-limiting examples of resin materials having flexibility, polyethylene, polypropylene, silicone, etc. can be cited.

As some non-limiting examples of the shape of the container body 12, there can be cited tubular shape (test tube-like shape), stick-like shape, a bag-like shape, a box-like shape, etc. For instance, in case the container body 12 is embodied as a bag-like container, the enclosure 20 will be stored in advance within this bag-like container body 12. And, when an external force is applied thereto, the bag-like container body 12 will be pressed and deformed to such a degree that the enclosure 20 therein is broken open thereby.

In the instant embodiment, the container body 12 will be exemplified as one having a bottomed (meaning having a bottom) tubular shape having the gas discharge port 14 in the form of an opening formed at one end of the container body 12 and a bottom plate portion 16 formed at the other end thereof and then sealed altogether.

(Gas-Permeable, Water-Impermeable or Gas-Permeable, Water-Permeation Retardant Member)

As an example of the gas-permeable, water-impermeable member provided at the gas discharge port, there may be employed a moisture-permeable, water-resistant sheet (or gas-permeable, water-impermeable sheet) that allows passage of gas, air, moisture, but does not allow passage of liquid therethrough. As this moisture-permeable, water-resistant sheet, it is possible to employ a micro-porous film (a film formed of a material defining a great number of micro pores) singly or to employ a material formed of multiple layers superposed and affixed to each other or to employ a coated type material formed of a high-density textile fabric with strong water-repellant coating applied thereto. As some specific examples of such material currently on the market, there can be cited Gore-Tex (registered trademark), EXEPOL (registered trademark: manufactured by Mitsubishi Resin Inc.: a material comprised of combination of a micro-porous polyolefin film and various non-woven fabrics, or the like), ENTRANT-E (registered trademark, manufactured by Toray Industries, Inc.), etc. Incidentally, regarding the water-impermeable member, it is preferred that this member have heat-sealing property (thermal welding property) for facilitating its attachment to the container body.

Further, the water-permeation retardant member having gas-permeability can be e.g. a sheet that allows permeation of gas, air, moisture, but hardly allows permeation of any liquid therethrough. As this water-permeation retardant member, it is possible to employ e.g. a known non-woven fabric. In particular, when a hydrophobic non-woven fabric is employed, as this has the property of repelling water, the fabric can be expected to achieve substantially equal performance as that of water-impermeable member.

(Enclosure)

The enclosure 20 employed in the instant embodiment is a container capable of sealing the aqueous chlorite solution 19 therein and easily breakable.

Here, the term "easily breakable" means a property of breakable or collapsible by being cracked or broken easily when deformed or bent (or yielded) with application thereto of a force from the outside. But, this must not be broken or damaged during transport or storage due to vibration or light shock. As some examples of easily breakable enclosure, there can be cited a glass ampoule, a plastic container having a relatively small thickness. In case a plastic container is employed as the easily breakable container, a weak portion may be provided therein in advance intentionally, so that a crack or split (break) may be formed at this weak portion when the container is bent (or yielded) with application of an external force.

(Chlorite)

As some non-limiting examples of a chlorite employed in the present invention, alkali metal chlorites and alkaline earth metal chlorites can be cited. As some non-limiting examples of alkali metal chlorites, there can be cited sodium chlorite, potassium chlorite, lithium chlorite. As some non-limiting example of alkaline earth metal chlorites, there can be cited calcium chlorite, magnesium chlorite, barium chlorite. Of these, in view of the readiness of availability, sodium chlorite and potassium chlorite are particular preferred. And, sodium chlorite is most preferred. Regarding these alkaline chlorites, one kind thereof may be employed singly or two kinds of them may be used in combination.

The ratio of the chlorite in the aqueous chlorite solution should preferably range from 0.1 wt. % to 30 wt. %. In the case of the ratio below 0.1 wt. %, this may cause a problem that shortage of chlorite occurs in the generation of chlorine dioxide gas. On the other hand, in the case of the ratio exceeding 30 wt. %, this will result in saturation of chlorite, tending to invite its crystal deposition. Therefore, in view of the safety and stability and efficiency of generation of chlorine dioxide gas, more preferred range is from 21 wt. % to 25 wt. %.

(Acidic Substance)

As the acidic substance that can be used in the present invention, this is an inorganic acid or an organic acid or a salt thereof. As some non-limiting examples thereof, there can be cited inorganic acids such as hydrochloric acid, sulfuric acid, nitric acid, phosphoric acid, boric acid, metaphosphoric acid, pyrophosphoric acid, sulphamic acid, and organic acids such as formic acid, acetic acid, propionic acid and butyric acid, lactic acid, pyruvic acid, citric acid, malic acid, tartaric acid, gluconic acid, glycolic acid, fumaric acid, malonic acid, maleic acid, oxalic acid, succinic acid, acrylic acid, crotonic acid, oxalic acid, glutaric acid and their salts. And, as examples of salts of inorganic acids, there can be cited salt of dihydrogen phosphate (sodium or potassium salt, the same applies hereinafter) and salt mixture of dihydrogen phosphate and hydrogen phosphate, etc.

Figure 4:
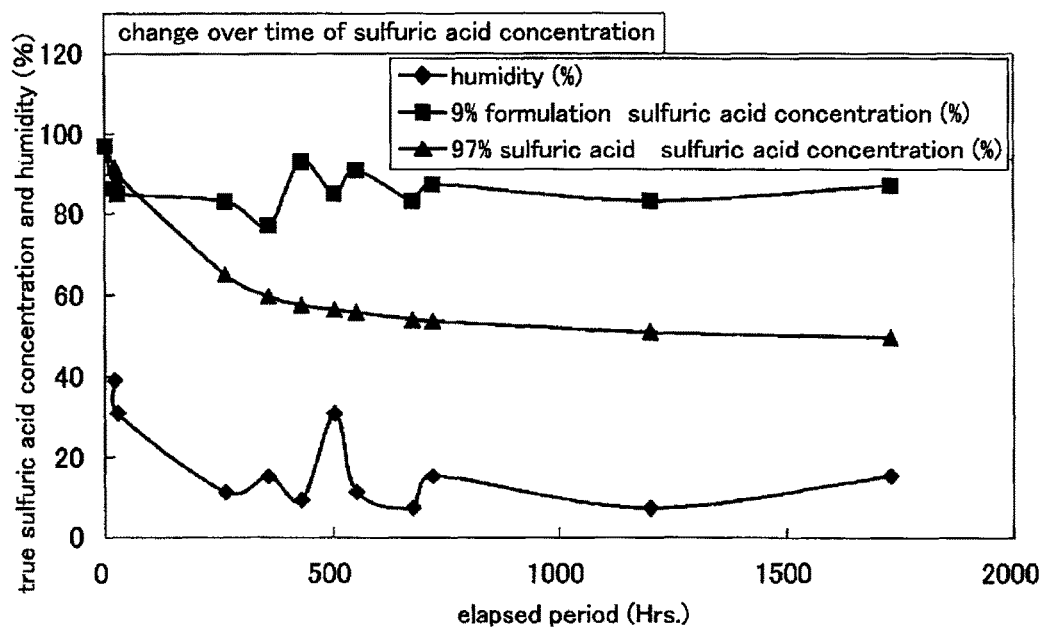
FIG. 4 is a graph showing results of stability test of a sulfuric acid formulation of inventive Example 4.

Of the above, it is preferred to employ sulfuric acid for such reasons as good storage stability, no generation of corrosive gas, no occurrence of density change even after it is caused to be supported on a porous material (or impregnated therein) (see Example 4, FIG. 4). The concentration of the sulfuric acid should be such that its final concentration when contained in the solid acidic composition ranges at 30 wt. % or less, or preferably, ranges at 10 wt. % or less in view of the safety. As the acidic substance, one kind thereof may be used singly or two or more kinds thereof may be used in combination.

(Porous Material)

As the porous material to be used in the present invention, a porous matter or a calcinated aggregate or the like can be employed. But, the invention is not limited thereto.

As some non-limiting examples of the porous material, there can be cited silica porous particles, sepiolite, montmorillonite, diatomaceous earth, talc, zeolite etc. Of these, it is preferred to employ silica porous particles as they are readily available and have good porosity (having large pore spaces) and readiness to contain the acidic substance or the chlorite. No particular limitations exist regarding the specific area of these silica porous particles.

As some non-limiting examples of the calcinated aggregate, there can be cited crushed flakes or powder prepared by calcination of animal bones (including mammals, fishes, birds), seashells, coral. As some non-limiting examples of the porous mater, there can be cited sepiolite, montmorillonite, diatomaceous earth, talc, zeolite etc.

Preferably, the porous material is disposed closer to the gas discharge port 14 than to the enclosure 20.

When the enclosure 12 is deformed to break (or collapse) the enclosure 20, e.g. the aqueous chlorite solution 19 flown out of the enclosure 20 comes into contact with the porous material. In this, an amount of chlorine dioxide gas generated in association with the contact between the acidic substance contained in the porous material and the aqueous chlorite solution 19 will be discharged via the gas discharge port 14 to the outside of the container body 12. In case the porous material is disposed closer to the gas discharge port 14 than to the enclosure 20 as in the above-described arrangement, the chlorine dioxide gas generated through the reaction will be discharged immediately to the outside of the container body 12 via the gas discharge port 14. Hence, a large amount of chlorine dioxide gas can be discharged at one time (at one setting and in a transitory manner) easily.

There is no particular limitation regarding the site (fumigation site) where the inventive generator is to be used. For instance, the generator can be used in any site such as in a commonplace or typical household (a living room, an entrance, a toilet, a kitchen, et.) and can also be used for industrial application (in a factory) or in a medical site such as a hospital, a medical office, a nursing home, or a public place such as a school, a train station, or public toilet, etc. Further, not only in a relatively large space such as an indoor living space for human living, the inventive generator can be used in a small space such as a refrigerator, a shoes box, an interior of vehicle (automobile, bus, train). In this way, the size of the space to which the inventive generator is applicable is not particularly limited. However, a closed space is preferred.

The inventive chlorine dioxide generator 10 can be used in a water tank storing an amount of water to produce an aqueous chlorine dioxide solution. The inventive method of producing chlorine dioxide of the present invention comprises a gas generating step for generating chlorine dioxide gas by deforming the container body 12 of the inventive chlorine dioxide generator 10 and a submerging step for submerging in water at least the gas discharge port 14 of the container body 12 under the above condition of chlorine dioxide gas generation so as to dissolve the chlorine dioxide gas discharged via the gas discharge port 14 in the water.

With the above, with utilizing the inventive chlorine dioxide gas generator 10 capable of readily generating chlorine dioxide gas, simply by submerging at least the gas discharge port 14 of the chlorine dioxide gas generator 10 having generated chlorine dioxide gas in water e.g. stored in a water tank, aqueous solution of chlorine dioxide can be produced easily.

Chlorine dioxide gas has a very high solubility. Therefore, in order to maximally reduce the free water in the reaction system, a porous material such as zeolite, silica gel, etc. is employed as a carrier in its reaction. Through the reduction of free water in the reaction system, it becomes possible to increase the reaction rate between the acidic substance such as sulfuric acid and the chlorite and also to reduce the dissolution amount of chlorine dioxide gas. Accordingly, it becomes possible to cause chlorine dioxide gas to be generated substantively at one setting (at one setting and in a transitory manner) in a high concentration.

As described above, when chlorine dioxide gas is generated with using the inventive chlorine dioxide generator 10, the generation of chlorine dioxide gas is effected at one setting and in a transitory manner in a large amount. Therefore, it is possible to reduce the fumigation treatment period (waiting period for human) of the space inside the fumigation room, so that a human can enter the fumigation room immediately after air ventilation.

Alternative Embodiment 1

Figure 5:
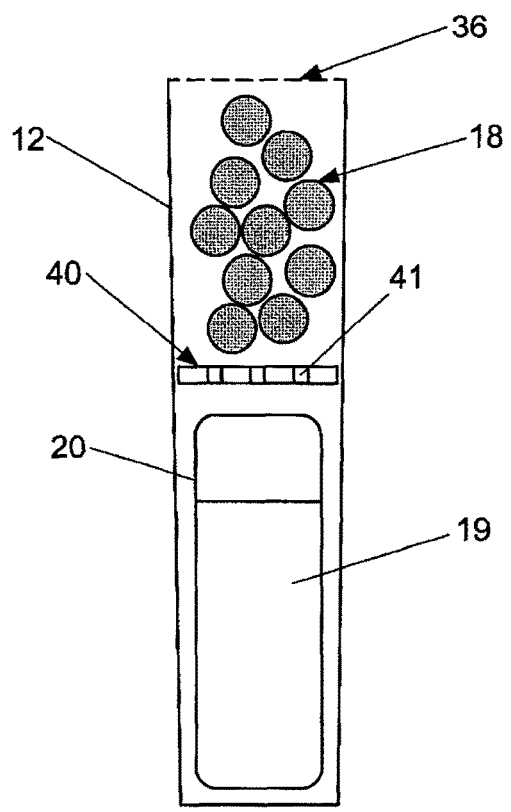
FIG. 5 is a section view of a generator illustrating a further embodiment of the present invention.

As shown in FIG. 5, the inventive chlorine dioxide generator 10 may further comprise an insulating member 40 for insulating the porous material and the enclosure 20 from each other, the insulating member 40 having at least one hole portion 41 and being disposed in such a manner as to be capable of preventing displacement of the porous material toward the enclosure 20.

In this embodiment, as the insulating member 40, there is exemplified a plate-like member having size/dimension set to be smaller than the inner diameter of the tubular container body 12 and defining a plurality of hole portions 41. However, the invention is not limited thereto. Since the insulating member 40 is disposed between the porous material and the enclosure 20 for preventing displacement of the porous material toward the enclosure 20, the porous material and the enclosure can be separated from each other in a reliable manner.

Since the insulating member 40 has the size/dimension set to be smaller than the inner diameter of the tubular container body 12, there is the possibility of this insulating member 40 being displaced inside the tubular container body 12. In this case, if the aqueous chlorite solution discharged from the enclosure 20 enters the gap between the insulating member 40 and the inner wall of the container body 12, the effect of the surface tension makes it difficult for the insulating member 40 to displace inside the container body 12.

In the chlorine dioxide generator 10, when the container body 12 is deformed to break open the enclosure 20 stored therein, the aqueous chlorite solution 19 will flow out of this enclosure 20 and then flow through the hole portions 41 to come into contact with the solid acidic composition 18. Then, by e.g. shaking the container 12 vertically after the flow-out of the aqueous chlorite solution 19 out of the enclosure 20, it is possible to cause the aqueous chlorite solution 19 to pass the hole portions 41 smoothly and easily. Once the aqueous chlorite solution 19 has passed the hole portions 41, if the shaking operation of the container body 12 is stopped, by the effect of surface tension, it becomes difficult for the aqueous chlorite solution 19 to flow in reverse through the hole portions 41 back into the enclosure 20.

Further, since the insulating member 40 is capable of preventing displacement of the porous material toward the enclosure 20, the porous material cannot pass the hole portions 41.

More particularly, the pore diameter of the hole portion 41 may be set so as to make liquid passage difficult due to the surface tension in the absence of external force application, and to be capable also of preventing passage of the porous material.

With the above-described arrangement, since displacement of the porous material disposed closer to the gas discharge port 14 than to the enclosure 20 toward this enclosure 20 can be prevented by the insulating member 40, it is possible to allow the reaction for generating chlorine dioxide gas to take place on the side of the gas discharge port 14 in a reliable manner. With this, it becomes even easier to discharge a large amount of chlorine dioxide gas at one time (at one setting and in a transitory manner).

Alternative Embodiment 2

The container body 12 may include a positioning means (not shown) for setting the movable range of the insulating member 40.

With the above-described arrangement providing a positioning means, the range of movement of the insulating member 40 inside the container body 12 can be set in a reliable manner by the positioning means. If e.g. the positioning means is used for setting the movable range of the insulating member 40 in such a manner as to prevent displacement of the porous material toward the enclosure 20 inside the container body 12, it becomes possible to allow the chlorine dioxide generation reaction to take place on the side of the gas discharge port 14 in a reliable manner. With this, it becomes even easier to discharge a large amount of chlorine dioxide gas at one time (at one setting and in a transitory manner).

The positioning means can be e.g. a projection formed on the inner circumferential face of the container body 12 for preventing movement of the insulating member 40. Or, it can be a tapered portion which renders the inner diameter of the container body 12 progressively decreased toward the bottom plate portion 16. If this tapered portion is formed not in the region inside the container body 12 to be filled with the porous material, but from the region to be filled with the enclosure 20, then, the insulating body 40 will become hooked by the diameter-reduced tapered portion, thus being prevented from moving toward the enclosure 20.

EXAMPLES

Example 1

In this Example described next, there was employed a chlorine dioxide generator 10 wherein a container body 12 having a tubular shape (test tube-like shape) as shown in FIG. 1 and formed of polypropylene stores, in its inner space, a tubular (bar-like) glass ampoule as the enclosure 20.

The container body 12 had dimensions of diameter: 16~18 mm×180 mm and the glass ampoule 20 had dimensions of diameter: 10 mm×130 mm approximately. The inside of the glass ampoule 20 was filled with 5 to 10 g of 25 wt. % chlorite solution (aqueous sodium chlorite solution) and was sealed by a conventional method. Upwardly of the glass ampoule 20, a solid acidic composition 18 was stored. As the solid acidic composition 18, there was stored a porous material formed of a porous material (silica gel having a specific surface area of $150 \text{ m}^2/\text{g}$: CARiACT Q-10 1.70-4.00 mm manufactured by Fuji Silysia Chemical Ltd.) impregnated with 10 wt. % aqueous sulfuric acid solution. Upwardly of the solid acidic composition 18, there was disposed a cushioning material 22 formed of a disc-like felt having cushioning effect.

Upwardly of this cushioning material 22, that is, at the opening portion formed at one end of the container body 12, a gas permeable film 36 formed of a gas-permeable, water-impermeable sheet was thermally fused to cover and seal this opening portion. In this way, the gas discharge port 14 in the present invention was constituted of the gas-permeable film 36. The gas-permeable film 36 employed in the instant embodiment was comprised of three sheets of EXEPOL. However, the invention is not limited thereto.

Then, the opposite ends of the container body 12 in the above-described chlorine dioxide generator 10 were held by hands to bend the container body 12 into an arcuate shape. With this, the easily breakable glass ampoule 20 stored therein was broken open, whereby the sodium chlorite aqueous solution flew out. As the porous material containing the aqueous sulfuric solution (acidic substance) was stored inside the container body 12, the flown-out aqueous chlorite solution came into contact with the porous material, whereby an amount of chlorine dioxide gas was generated. This chlorine dioxide gas generated inside the container body 12 could be discharged via the gas discharge port 14 comprised of the gas-permeable film 36 to the outside of the container body 12.

In association with this discharge of chlorine dioxide gas via the gas discharge port 14, it was possible to carry out a chlorine dioxide treatment (sterilizing treatment of germs, fungi, virus inactivation treatment, extermination treatment of harmful insects, etc.) to a treatment object for a predetermined period inside a fumigation room with this enhanced chlorine dioxide concentration.

In the present invention, when sulfuric acid was employed as an acidic substance, even with sulfuric acid of a low concentration as low as e.g. 10 wt. % in the solid acidic composition, it was still possible to generate a large amount of chlorine dioxide gas at one time (at one setting and in a transitory manner altogether). Therefore, as the concentration of sulfuric acid used as a powerful agent can be low, handling becomes easier and there is obtained also high safety. Moreover, as the fumigation period can be shorter, a human can enter the fumigation room immediately after air ventilation.

[Example 2] (Chlorine Dioxide Gas Generation Test 1)

Generation rates of chlorine dioxide gas were compared between a case when an acidic substance (sulfuric acid) and a porous material (silica gel) were mixed [a sulfuric acid formulation (silica gel)] and a case when an acidic substance (sulfuric acid) and water were mixed (an aqueous sulfuric acid solution: Comparison Example).

After 10 g of silica gal (CARi ACT Q-10 1.70-4.00 mm manufactured by Fuji Silysia Chemical Ltd.) and 2.2 g of 50 wt. % sulfuric acid solution were mixed and stirred together, the resultant solution was air-dried to obtain a sulfuric acid formulation A1 (final concentration of sulfuric acid: 9 wt. % in solid acidic composition 18). On the other hand, 10 g of water and 2.2 g of 50 wt. % sulfuric acid solution were mixed and stirred together, thereby to obtain an aqueous sulfuric acid solution A2 (final concentration of sulfuric acid: 9 wt. %).

Into a polyethylene tubular container (diameter 10 mm×125 mm) 12 as a container body 12, a glass ampoule (enclosure 20: diameter 7 mm×75 mm) 20 enclosing therein 1.2 g of 25 wt. % sodium chlorite solution was stored. Subsequently, into this container body 12, the sulfuric acid formulation A1 and the cushioning material (manufactured by Sumitomo 3M Limited, G-43) 22 were stored one after another in this order and a gas-permeable film (EXEPOL manufactured by Mitsubishi Plastics, Inc.) 36 was thermally fused to the opening portion of the container body 12, thus making a chlorine dioxide generator 10.

On the other hand, a chlorine dioxide generator of a comparison example was made by storing the sulfuric acid solution A2 in the container body 12 instead of the sulfuric acid formulation A1.

For determination of chlorine dioxide gas concentration, there was employed a concentration determining chamber having silicone hollow tubes ("silicone tubes" hereinafter) connected to the left and right faces of a 6.7 L polyethylene container. In this concentration determining chamber, there was stored the chlorine dioxide generator 10 bent into an arcuate form and mixed by turnover. Thereafter, by using an air pump (manufactured by ARTEM LTD.: W-600) via the silicone tube fixed to one end of the chamber, air was caused to pass the inside of the chamber along a predetermined direction. Then, the concentration of chlorine dioxide gas flown out of the exit-side tube connected to the opposite face of the chamber was determined by a KITAGAWA type chlorine dioxide gas detector tube (KOMYO RIKAGAKU KOGYO K.K.: No. 116). For the chlorine dioxide generator of the comparison sample too, the chlorine dioxide gas concentration was determined by the same method.

The flow rate of air was determined by a flow meter (AIR FLOW SENSOR FD-A1, KEYENCE CORPORATION) as 1 L/min. From the determined chlorine dioxide gas concentration, the generation rates of chlorine dioxide gas were calculated by the following formula.

$$\text{generation rate (mg/h)} = [\text{concentration (ppmv)} \times 2.8 \text{ (mg/m}^3\text{)}] \times \text{flow rate (L/min.)} \times 60 \text{ (min)} \quad [\text{Mathematical Formula 1}]$$

As shown in FIG. 2, in the case of using the inventive chlorine dioxide generator 10 storing the sulfuric acid formulation A1 in the container body 12, the chlorine dioxide generation rate reached 12 mg/h after lapse of 3 minutes subsequent to bending of the container body 12 into the arcuate shape. On the other hand, in the case of using the aqueous sulfuric acid solution A2, although the chlorine dioxide concentration progressively rose after the arcuate bending of the container body 12, the rate was 6 mg/h after lapse of 3 minutes and reached only 9 mg/h even after lapse of 10 minutes.

That is, the chlorine dioxide generation rate after lapse of 3 minutes subsequent to the arcuate bending of the container body 12 was twice (12/6) as high with the inventive chlorine dioxide generator 10 as with the chlorine dioxide generator of the comparison example.

From the above-described results, it was found that the inventive chlorine dioxide generator 10 using the sulfuric acid formulation A1 comprising the porous material containing an acidic substance can generate chlorine dioxide gas by a greater amount at one setting in a transitory manner, thus being more suitable for fumigation.

[Example 3] (Chlorine Dioxide Gas Generation Test 2)

Generation rates of chlorine dioxide gas were compared between a case when an acidic substance (sulfuric acid) and a porous material (zeolite) were mixed [a sulfuric acid formulation (zeolite)] were mixed and a case when an acidic substance (sulfuric acid) and water were mixed (an aqueous sulfuric acid solution: Comparison Example).

After 10 g of zeolite (manufactured by OMI KOGYO Ltd.: particle diameter 1 to 3 mm) and 2.2 g of 50 wt. % sulfuric acid solution were mixed and stirred together, the resultant solution was air-dried for one hour to obtain a sulfuric acid formulation B1 (final concentration of sulfuric acid: 9 wt. % in solid acidic composition 18). On the other hand, 10 g of water and 2.2 g of 50 wt. % sulfuric acid solution were mixed and stirred together, thereby to obtain an aqueous sulfuric acid solution B2 (final concentration of sulfuric acid: 9 wt. %).

Into a polyethylene tubular container (diameter 10 mm×125 mm) as a container body 12, a glass ampoule (enclosure 20: diameter 7 mm×75 mm) 20 enclosing therein 1.2 g of 25 wt. % sodium chlorite solution was stored. Subsequently, into this container body 12, the sulfuric acid formulation B1 and the cushioning material (manufactured by Sumitomo 3M Limited, G-43) 22 were stored one after another in this order and a gas-permeable film (EXEPOL manufactured by Mitsubishi Plastics, Inc.) 36 was thermally fused to the opening portion of the container body 12, thus making a chlorine dioxide generator 10.

On the other hand, a chlorine dioxide generator of a comparison example was made by storing the sulfuric acid solution B2 in the container body 12 instead of the sulfuric acid formulation B1.

The determination of chlorine dioxide gas concentration was effected in the same manner as Example 2 above.

As shown in FIG. 3, in the case of using the inventive chlorine dioxide generator 10 storing the sulfuric acid formulation B1 in the container body 12, the chlorine dioxide generation rate reached 12 mg/h after lapse of 2 to 10 minutes subsequent to bending of the container body 12 into the actuate shape, and the rate was 10 mg/h after lapse of 15 minutes.

On the other hand, in the case of using the aqueous sulfuric acid solution B2, although the chlorine dioxide concentration progressively rose after the arcuate bending of the container body 12, the rate was 6 mg/h after lapse of 2 minutes and reached only 9 mg/h even after lapse of 10 to 15 minutes.

That is, the chlorine dioxide generation rate after lapse of 2 minutes subsequent to the arcuate bending of the container body 12 was twice (12/6) as high with the inventive chlorine dioxide generator 10 as with the chlorine dioxide generator of the comparison example.

From the above-described results, it was found that the inventive chlorine dioxide generator 10 using the sulfuric acid formulation B1 comprising the porous material containing an acidic substance can generate chlorine dioxide gas by a greater amount at one setting in a transitory manner, thus being more suitable for fumigation.

[Example 4] (Stability Test of Sulfuric Acid Formulation)

After 10 g of zeolite (manufactured by OMI KOGYO Ltd.: particle diameter 1 to 3 mm) and 1.1 g of 97 wt. % sulfuric acid solution were mixed and stirred together, the resultant solution was air-dried for one hour to obtain a sulfuric acid formulation C1 (final concentration of sulfuric acid: 9 wt. %). Then, the stability of this sulfuric acid formulation C1 under indoor environment was investigated.

In a beaker, the 9 wt. % sulfuric acid formulation C1 was charged and placed in a room which has a floor area of 12 tatami-mats (Japanese mat). Thereafter, changes in weight over time of the sulfuric acid formulation C1 were determined for over 1500 hours with using a precision balance scale (FIG. 4). FIG. 4 shows humidity changes in the room as well as weight changes in 97% sulfuric acid solution as a control.

As a result, the weight of the sulfuric acid formulation C1 was stable as being maintained generally at 80 wt. % or more; and unlike the 97% sulfuric acid in the liquid form, concentration reduction to about 50 wt. % did not occur. Hence, it was found that the sulfuric acid formulation C1 is less susceptible to influence from indoor environmental factors. Therefore, the chlorine dioxide generator 10 according to the present invention can be stored for a long period of time.

Example 5

Differences in the generation amount depending on the charging position of the sulfuric acid formulation (silica gel) when chlorine dioxide gas was generated by the inventive chlorine dioxide generator 10 were investigated. The charging positions were a upper position in the container body 12 (on the side of the gas discharge port 14) and a lower position in the container body 12 (on the side of the bottom plate portion 16).

In the case of the charging position of the sulfuric acid formulation upwardly of the container body 12, the insulating member 40 was placed between the sulfuric acid formulation (the porous material) and the enclosure 20 for preventing displacement of the porous material toward the enclosure 20. In the case of the charging position of the sulfuric acid formulation downwardly of the container body 12, the insulating member 40 was not used.

In each case, the container body 12 was deformed to break the enclosure 20 to cause 1 g of the sulfuric acid formation and 1 g of aqueous chlorite solution (25% aqueous sodium chlorite solution) 19 to come into contact with each other to generate an amount of chlorine dioxide gas. On the generated chlorine dioxide gas, the generation amount (mg) of chlorine dioxide gas was investigated (0 to 15 minutes at the constant temperature of 20° C.) by the iodometric method.

In the iodometric method, the generated chlorine dioxide gas was dissolved in a potassium iodide solution and the resultant mixture solution was titrated with sodium thiosulfate solution. And, the chlorine gas generation amount (mg) was calculated with using the following formula. In the following formula, A represents the titration amount, B represents the molar concentration of sodium thiosulfate and the molecular weight of chlorine dioxide was set as 67.45.

Figure 6:
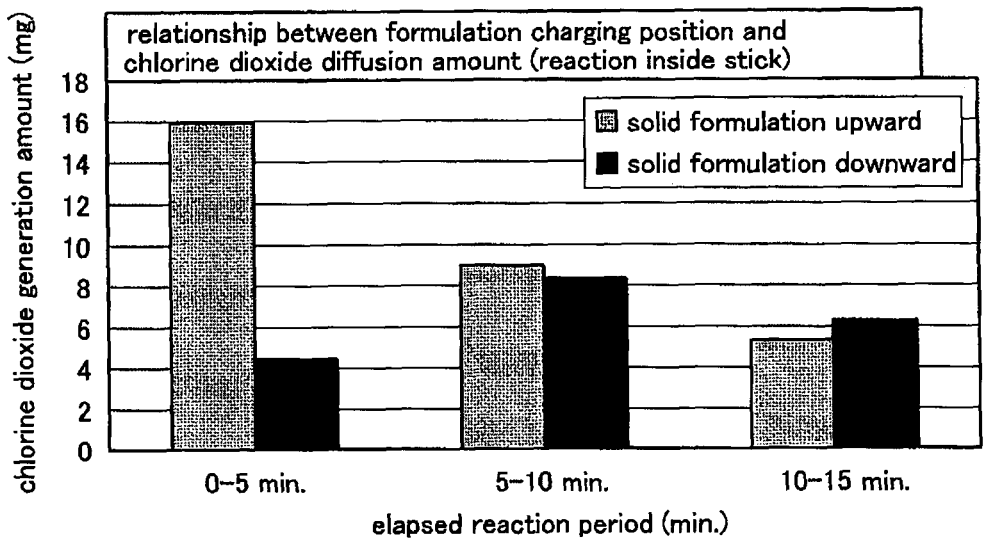
FIG. 6 is a graph showing the result of investigation of difference in the generation amount depending on the charging position of a sulfuric acid formulation (silica gel).

The results are shown in Table 1 and FIG. 6.

generation amount (mg)=$A$ (mL)×67.45 (1000 mg/mol)×$B$ (mol/1000 mL).     [Mathematical Formula 2]

TABLE 1

| | upper position in container body | lower position in container body |
| --- | --- | --- |
| 0 to 5 min. | 15.96 | 4.38 |
| 5 to 10 min. | 8.97 | 8.30 |
| 10 to 15 min. | 5.29 | 6.21 |
| total (0 to 15 min.) | 30.22 | 18.89 |

From the results above, it was found that in the period of 0 to 5 minutes, the chlorine dioxide gas generation amount was more than three times greater (3.64 times: 15.96/4.38) in the case of charging the sulfuric acid formulation at the upper position in the container body 12.

In the period of 5 to 10 minutes, the generation amounts were substantially same and in the period of 10 to 15 minutes, the amount was slightly greater in the case of charging the sulfuric acid formulation at the lower position in the container body 12.

In the case of charging the sulfuric acid formulation at the upper position in the container body 12, the gas generation peaked in the period of 0 to 5 minutes. Thereafter, the generation amount decreased rapidly (41% decrease). Whereas, in the case of charging the sulfuric acid formulation at the lower position in the container body 12, the gas generation peaked in the period of 5 to 10 minutes. The generation amount decrease thereafter was about 25%. Also, as to the total generation amounts of the chlorine dioxide gas in the period of 0 to 15 minutes, the amount in the case of charging the sulfuric acid formulation at the upper position in the container body 12 was about 1.6 times as great (30.22/18.89) as the case of charging the sulfuric acid formulation at the lower position in the container body 12.

With this, it was found that a greater amount of chlorine dioxide gas can be discharged at one time (at one setting and in a transitory manner) when the sulfuric acid formulation (porous material) is disposed closer to the gas discharge port 14 than to the enclosure 20.

Example 6

Differences in the generation of chlorine dioxide gas between the case when the acidic substance was carried by a porous material (silica gel) and the case when the acidic substance was in the form of a solution were investigated. As the porous material, there was employed one carrying 10% sulfuric acid. And, as the aqueous solution, there were employed 30% and 10% sulfuric acid solutions.

Only in the case of the acidic substance being carried by the porous material, the insulating member 40 was employed. The aqueous acidic solution was reacted under the condition of the solution being deposited on the bottom of the container body 12. In each case, the container body 12 was deformed to break the enclosure 20 to cause 1 g of the acidic substance and 1 g of aqueous chlorite solution (25% aqueous sodium chlorite solution) 19 to come into contact with each other to generate an amount of chlorine dioxide gas. On the generated chlorine dioxide gas, the generation amount (mg) of chlorine dioxide gas was investigated (0 to 15 minutes at the constant temperature of 20° C.) by the iodometric method.

Figure 7:
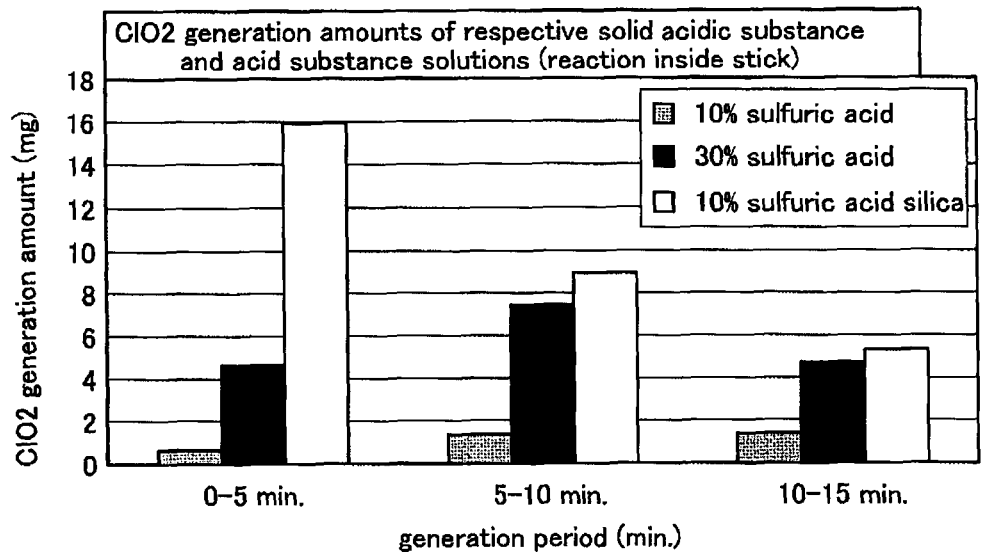
FIG. 7 is a graph showing the result of investigation of difference in the generation amount between a case where an acidic substance was carried by a porous material (silica gel) and a case where the acidic substance was prepared in the form of an aqueous solution (using the chlorine dioxide generator.

The results are shown in Table 2 and FIG. 7.

TABLE 2

|  | 10% sulfuric acid aqueous solution | 30% sulfuric acid aqueous solution | 10% sulfuric acid (silica gel) |
|---|---|---|---|
| 0 to 5 min. | 0.67 | 4.72 | 15.96 |
| 5 to 10 min. | 1.35 | 7.42 | 8.97 |
| 10 to 15 min. | 1.35 | 4.72 | 5.29 |
| total (0 to 15 min.) | 3.37 | 16.86 | 30.22 |

As a result, when the reaction was effected by causing the porous material (silica gel) to carry sulfuric acid, the generation amounts of chlorine dioxide gas were greater than the case of the reaction being effected in the form of sulfuric acid aqueous solution.

In the period of 5 to 10 minutes, the case when the reaction was effected with using the dense sulfuric acid aqueous solution as thick as 30% showed a generation amount (7.42) near that (8.97) of the case when the reaction was effected with causing the porous material to carry sulfuric acid. However, as for the total generation amount of chlorine dioxide gas in the period from 0 to 15 min., the generation amount was 44% (16.86/30.22) less than the case of the reaction being effected with using the 30% sulfuric acid solution than the case of the reaction being effected with causing the porous material to carry sulfuric acid. From this, it was found that the generation amount of chlorine dioxide gas is greater in the case of causing the acid substance to be carried by the porous material.

Example 7

Chlorine dioxide aqueous solution was produced with using the chlorine dioxide generator 10 according to the present invention.

In this example, chlorine dioxide gas was generated by deforming the container body 12 of the chlorine dioxide generator 10. Then, by submerging the gas discharge port 14 of the container body 12 in which the chlorine dioxide gas was generated in 500 mL of water stored in a bottle, the aqueous chlorine dioxide solution was prepared.

Figure 8:
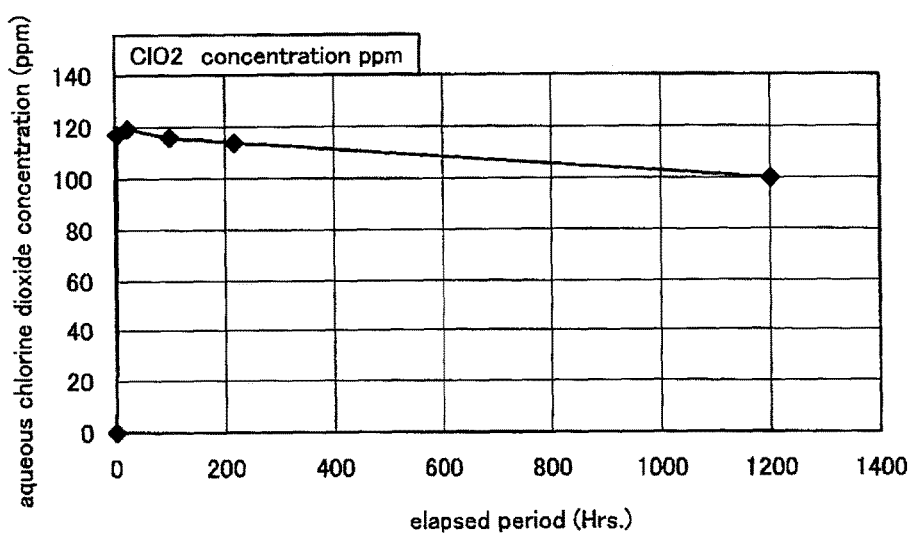
FIG. 8 is a graph showing results of determination of concentrations of aqueous chlorine dioxide solutions prepared.

From the timing of submerging the gas discharge port 14 of the container body 12, concentrations of chlorine dioxide in the aqueous chlorine dioxide solution were determined. The results are shown in Table 3 and FIG. 8. Incidentally, at the time of lapse of 5.3 hours after the start of test, absorption of chlorine dioxide in water was stopped and after lapse of 22.6 hours, the bottle was sealed and stored at a cold dark place.

TABLE 3

| elapsed time (hrs.) | concentration (ppm) |
|---|---|
| 0 | 0 |
| 5.3 | 117 |
| 22.6 | 119 |
| 100.3 | 116 |
| 216.2 | 114 |
| 1200.2 | 100 |

As a result, it was found that it is readily possible to produce aqueous chlorine dioxide solution only by submerging the gas discharge port 14 of the chlorine dioxide generator 10 containing chlorine dioxide gas generated therein in water. Further, if the obtained chlorine dioxide aqueous solution is sealed and stored in a cold dark place, the concentration of chlorine dioxide becomes very stable, so that this can be used in various situations as a pure aqueous chlorine dioxide solution free from chlorine dioxide ions or activating agents, or the like.

Other Embodiments

In the foregoing embodiment, there was exemplified a case wherein aqueous sodium chlorite solution was sealed inside a glass ampoule 20 and an acidic substance was contained in a porous material as a solid acidic composition. However, the invention is not limited to this embodiment. Instead, an aqueous solution of an acidic substance may be sealed inside the glass ampoule 20 as an enclosure and there may be used a solid chlorite composition comprised of a porous material carrying chlorite (sodium chlorite, etc.) and the container body 12 may store therein the solid chlorite composition and the aqueous solution of the acidic substance under a non-contact condition from each other.

INDUSTRIAL APPLICABILITY

The present invention may be used as a chlorine dioxide generator for generating chlorine dioxide gas through reaction between a chlorite and an acidic substance.

DESCRIPTION OF REFERENCE MARKS/NUMERALS

10 chlorine dioxide generator
12 container body
14 gas discharge port
18 solid acidic composition
19 aqueous chlorite solution
20 enclosure

The invention claimed is:
1. A method of producing chlorine dioxide comprising:
generating chlorine dioxide gas by deforming a container body of a chlorine dioxide generator which is deform- able in response to application of a force to the container body from outside of the container body;

the container body including a gas discharge port formed of a gas-permeable, water-impermeable or gas-permeable, water-permeation retardant member, the container body except for the gas discharge port being sealed, thus having a water-impermeable construction;

the container body containing a solid acidic composition and an aqueous chlorite solution under a non-contact condition from each other;

the solid acidic composition comprising a porous material containing an acidic substance that exhibits acidity when dissolved in water; and the aqueous chlorite solution being sealed within a breakable enclosure;

the deforming of the container body causing the enclosure contained in the container body to be broken to bring the aqueous chlorite solution into contact with the solid acidic composition to generate chlorine dioxide gas that is discharged via the gas discharge port to outside of the container body; and submerging in water at least the gas discharge port of the container body during the generation of the chlorine dioxide gas to dissolve the chlorine dioxide gas discharged via the gas discharge port in the water, wherein the chlorine dioxide generator further comprises an insulating member that insulates the porous material and the enclosure from each other, the insulating member including at least one hole and being disposed to prevent displacement of the porous material toward the enclosure.

2. The method according to claim 1, wherein the container body is a flexible tube that is flexible into an arcuate shape in response to application of the external force.

3. The method according to claim 1, wherein the acidic substance comprises sulfuric acid and the chlorite comprises sodium chlorite or potassium chlorite.

4. The method according to claim 1, wherein the acidic substance has a concentration of 30 wt. % or less and the chlorite has a concentration from 0.1 to 30 wt. %.

5. The method according to claim 1, wherein the porous material is disposed closer to the gas discharge port than to the enclosure.

6. The method according to claim 1, wherein the container body includes positioning means for setting a movable range of the insulating member.

7. The method according to claim 1, further comprising setting a movable range of the insulating member.

8. A method of producing chlorine dioxide comprising:
generating chlorine dioxide gas by deforming a container body of a chlorine dioxide generator which is deformable in response to application of a force to the container body from outside of the container body;

the container body including a gas discharge port formed of a gas-permeable, water-impermeable or gas-permeable, water-permeation retardant member, the container body except for the gas discharge port being sealed, thus having a water-impermeable construction;

the container body containing a solid acidic composition and an aqueous chlorite solution under a non-contact condition from each other;

the solid acidic composition comprising a porous material containing an acidic substance that exhibits acidity when dissolved in water; and the aqueous chlorite solution being sealed within a breakable enclosure;

the deforming of the container body causing the enclosure contained in the container body to be broken to bring the aqueous chlorite solution into contact with the solid acidic composition to generate chlorine dioxide gas that is discharged via the gas discharge port to outside of the container body;

submerging in water at least the gas discharge port of the container body during the generation of the chlorine dioxide gas to dissolve the chlorine dioxide gas discharged via the gas discharge port in the water; and preventing displacement of the porous material toward the enclosure.

9. A method of producing chlorine dioxide comprising:
generating chlorine dioxide gas by deforming a container body of a chlorine dioxide generator which is deformable in response to application of a force to the container body from outside of the container body;

the container body including a gas discharge port formed of a gas-permeable, water-impermeable or gas-permeable, water-permeation retardant member, the container body except for the gas discharge port being sealed, thus having a water-impermeable construction;

the container body containing a solid chlorite composition and an aqueous solution of an acidic substance under a non-contact condition from each other;

the solid chlorite composition comprising a porous material impregnated with an aqueous solution of chlorite;

the aqueous solution of acidic substance being sealed within an easily breakable enclosure; and the deformation of the container body causing the enclosure contained in the container body to be broken to bring the aqueous acidic substance solution into contact with the solid chlorite composition to generate chlorine dioxide gas that is discharged via the gas discharge port to outside of the container body; and submerging in water at least the gas discharge port of the container body during the generation of the chlorine dioxide gas to dissolve the chlorine dioxide gas discharged via the gas discharge port in the water.

10. The method according to claim 9, wherein the container body is a flexible tube that is flexible into an arcuate shape in response to application of the external force.

11. The method according to claim 9, wherein the acidic substance comprises sulfuric acid and the chlorite comprises sodium chlorite or potassium chlorite.

12. The method according to claim 9, wherein the acidic substance has a concentration of 30 wt. % or less and the chlorite has a concentration from 0.1 to 30 wt. %.

13. The method according to claim 9, wherein the porous material is disposed closer to the gas discharge port than to the enclosure.

14. The method according to claim 9, wherein the chlorine dioxide generator further comprises an insulating member that insulates the porous material and the enclosure from each other, the insulating member including at least one hole and being disposed to prevent displacement of the porous material toward the enclosure.

15. The method according to claim 9, wherein the container body includes positioning means for setting a movable range of an insulating member.

16. The method according to claim 9, further comprising insulating the porous material and the enclosure from each other.

17. The method according to claim 9, further comprising preventing displacement of the porous material toward the enclosure.

18. The method according to claim 9, further comprising setting a movable range of an insulating member.

* * * * *